United States Patent [19]

Becher

[11] Patent Number: 4,898,502

[45] Date of Patent: Feb. 6, 1990

[54] MECHANICAL DRILLING AID

[76] Inventor: Reinhard Becher, Engelbergstrasse 42, D-7000 Stuttgart 31, Fed. Rep. of Germany

[21] Appl. No.: 286,627

[22] Filed: Dec. 19, 1988

[30] Foreign Application Priority Data

Sep. 29, 1988 [DE] Fed. Rep. of Germany ....... 3833040

[51] Int. Cl.⁴ .............................................. B23B 49/02
[52] U.S. Cl. .................................. 408/72 B; 408/79; 408/241 B; 411/79; 411/447
[58] Field of Search .................... 408/72 R, 72 B, 79, 408/80, 81, 82, 75, 97, 110, 112, 115 R, 241 B, 115 B; 411/75, 80, 79, 169, 446, 447, 448, 539; 29/402.01, 402.09, 402.11, 402.17

[56] References Cited

U.S. PATENT DOCUMENTS

| 1,758,235 | 5/1930 | Nash | 408/72 |
| 2,670,637 | 3/1954 | Whitechester | 408/79 |
| 2,670,639 | 3/1954 | Flowers et al. | 408/82 |
| 2,674,906 | 4/1954 | Timpner | 408/79 |
| 2,811,878 | 11/1957 | Morgan, Jr. | 408/97 |

FOREIGN PATENT DOCUMENTS

| 1216068 | 5/1966 | Fed. Rep. of Germany | 408/81 |
| 2255598 | 11/1972 | Fed. Rep. of Germany | |
| 3640870 | 6/1988 | Fed. Rep. of Germany | |
| 145114 | 4/1962 | U.S.S.R. | 408/79 |
| 743792 | 7/1980 | U.S.S.R. | 408/79 |

Primary Examiner—Daniel Howell
Attorney, Agent, or Firm—Harness, Dickey & Pierce

[57] ABSTRACT

A mechanical drilling aid serves for guiding a drilling tool (42) when drilling a bore into an object, in particular into a wall (39), eccentrically to an existing faulty bore (20), when the cross-sections of the faulty bore (20) and the correct bore intersect each other or extend immediately adjacent each other. In order to ensure simple and exact guiding of the drill during the drilling operation, the mechanical drilling aid comprises a guide element (14) provided with a cylindrical opening (25) for guiding the drilling tool (42). A rod-shaped part (16), which is capable of being introduced into the faulty bore (20) projects from the guide element (14) and can be applied against the inner wall (21) of the faulty bore (20), at least along one outer edge (18), the distance between the outer edge (18) of the rod-shaped part (16) and a longitudinal center axis of the cylindrical opening (25), measured across the center point of the cross-section of the faulty bore, being equal to the sum of the amount of eccentricity between the faulty bore and the bore, and the radius of the faulty bore (FIG. 7).

15 Claims, 4 Drawing Sheets

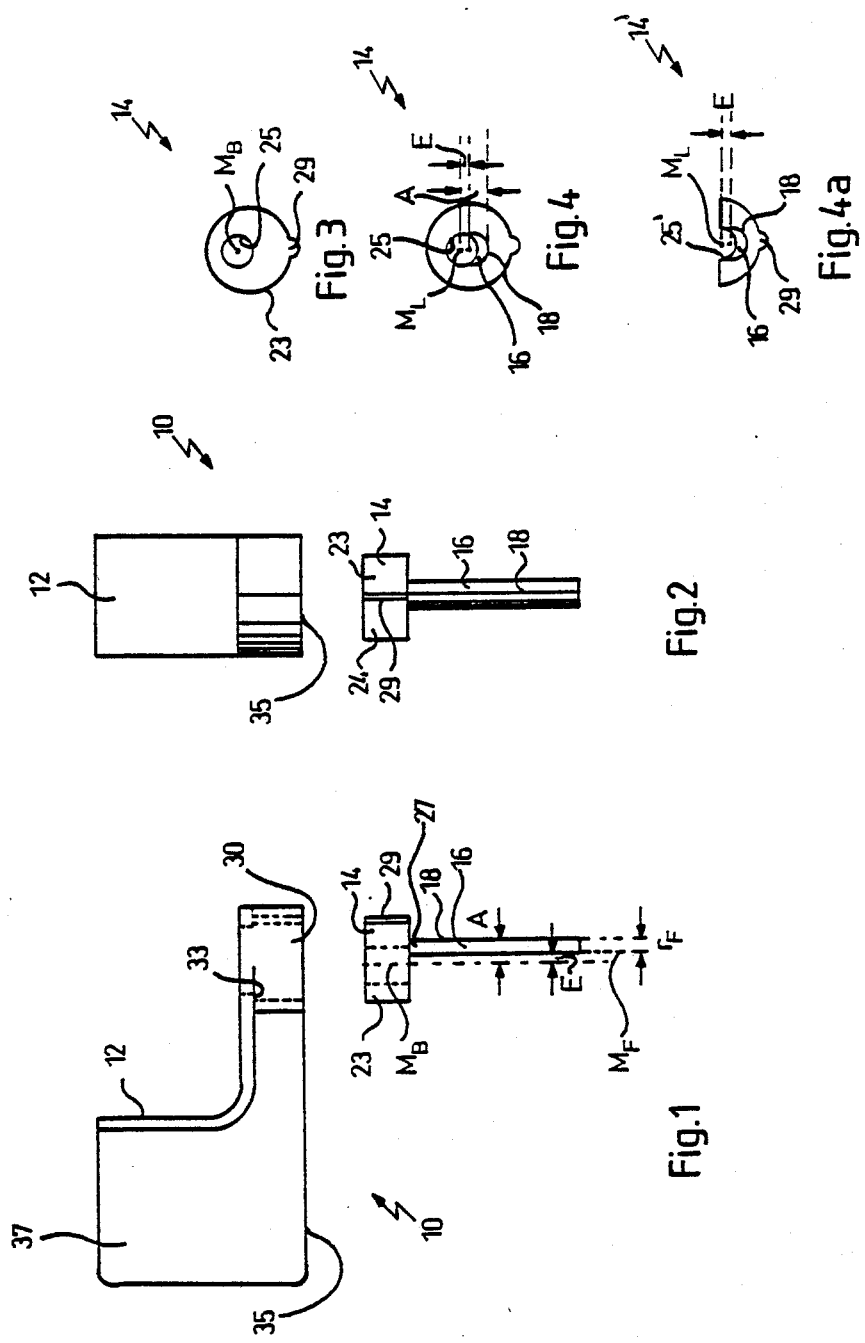

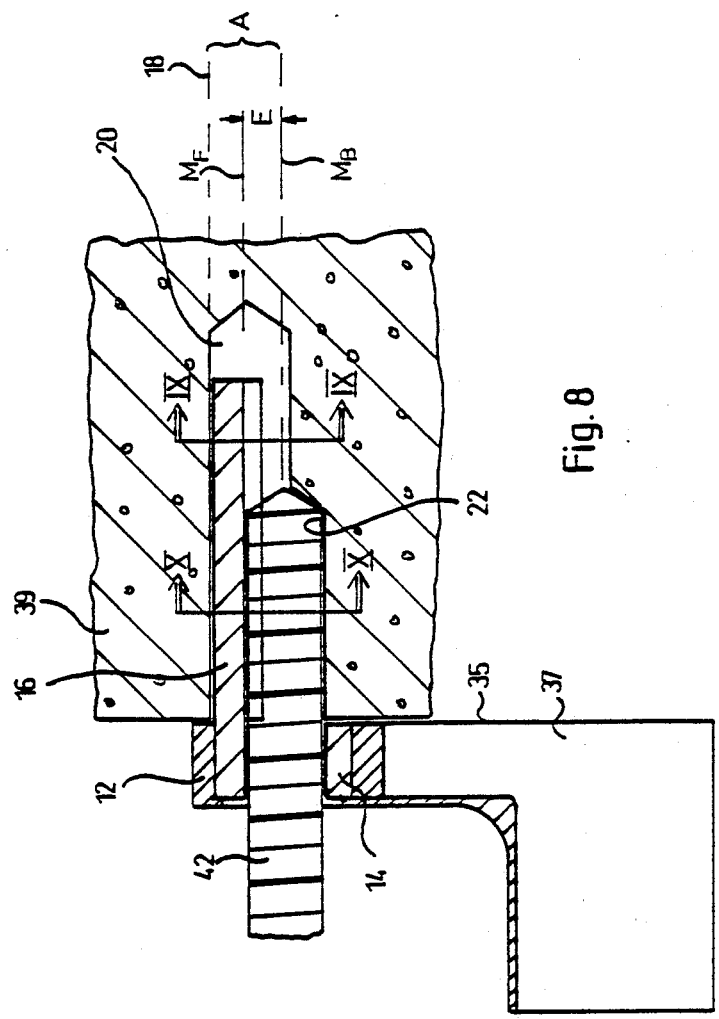
Fig. 8
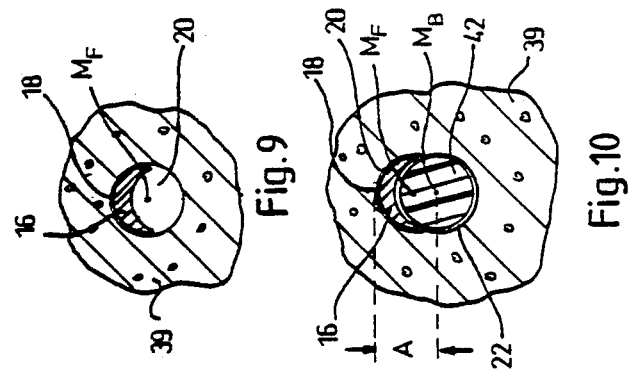
Fig. 9
Fig. 10

MECHANICAL DRILLING AID

The present invention relates to a mechanical drilling aid for guiding a drilling tool when drilling a bore into an object, in particular into a wall, eccentrically to an existing faulty bore, when the cross-sections of the faulty bore and the correct bore intersect each other or extend immediately adjacent each other.

When drilling bores into an object, in particular into a wall, there is always a risk that the drilling tool may run off center, i.e. that the longitudinal center axis of the cylindrical bore obtained may be set off relative to the desired position of the bore. A bore of this type is generally described as a faulty bore. A faulty bore may result also from errors occurring when measuring out the point of application of the drilling tool so that although being exactly cylindrical, the bore obtained is set off by a certain amount relative to the desired location of the bore. The offset between the longitudinal center axes of the faulty bore and the correct bore is generally described as eccentricity of the two bores.

When a correct bore is to be applied in cases where the cross-sections of the faulty bore and the correct bore intersect each other or are arranged immediately adjacent each other, exact guiding of the drilling tool is extremely difficult because during drilling of the correct bore the tool has the tendency to run off or migrate into the faulty bore. Consequently, the contours of the hole obtained will not be precisely defined so that the hole will not be capable of retaining a wall anchor, for example, with the required stability.

A solution for the problem presented by such faulty bores or out-of-center bores has been known from DE-OS 22 55 598. According to the proposal of this publication, the faulty bore is enlarged by applying another coaxial bore of a substantially larger diameter. The circumferential surface of the hole so obtained must be big enough to embrace at least the cross-sectional surface of the desired correct bore. This large hole is then filled by a plug provided with an eccentric blind bore whose size and location correspond exactly to the desired bore. Thereafter, the respective part, for example a screw or a pin, can be introduced exactly in the correct position.

However, it is a disadvantage of this solution that a very big hole must be drilled into the wall, in particular when the faulty bores have run off center a relatively big distance, as it must be ensured in any case that the big bore applied subsequently embraces the cross-sectional surface of the desired exact bore. If, for example, the bore is to be drilled into a concrete wall, this will cause a lot of labor and cost as drilling relatively big holes in concrete is always very troublesome, even when high-power drilling tools are used. If, for example, a bore of 10 mm dia. has run off center by 3 mm, the second bore must be drilled with a diameter of 16 mm so that the bore obtained is considerably larger than the originally intended hole. A hole or blind bore of this size may impair the stability of the object into which the bore has been drilled. Moreover, if the bore is to receive a part subjected to high tension or transverse forces, the plug used to fill the residual space must consist of a high-quality material as it is in fact intended to replace the solid mass that should not have been removed. In addition, the risk that the bore may run off center cannot be excluded for the second bore, either.

Now, it is the object of the present invention to remedy this problem and to provide a mechanical drilling aid which enables the correct bore to be drilled exactly and easily, without any need to use a drilling tool of a larger diameter, relative to the faulty bore.

This object is achieved according to the invention by the fact that a mechanical drilling aid comprises a guide element provided with an opening with a cylindrical wall intended for guiding the drilling tool, and a rod-shaped part projecting from the guide element and capable of being introduced into the faulty bore and of being applied against the inner wall of the faulty bore, at least along one outer edge, the distance A between the outer edge of the rod-shaped part and the longitudinal center axis of the circumferential circle of the cylindrical opening corresponding to the circumferential circle of the drilling tool, measured across the center point $M_F$ of the cross-section of the faulty bore, being equal to the sum of the amount of eccentricity E between the faulty bore and the bore, and the radius $r_F$ of the faulty bore.

The projecting part of the guide element that can be introduced into the faulty bore and applied along its outer edge against the inner wall of the faulty bore, provides a point of reference between the faulty bore and the point of application of the tool for the correct bore. The opening in the guide element with the cylindrical wall, whose circumferential circle corresponds to the circumferential circle of the drilling tool, ensures that the drilling tool is guided exactly in the axial direction, i.e. in the direction of feed. The rod-shaped part of the guide element which is introduced into the faulty bore prevents the drilling tool present in the opening of the guide element safely from running off center. The combination between the guide element and the projection part, therefore, ensures that the drilling tool cannot run off center transversely to its axial direction of feed. The drilling aid may, for example, be gripped by one hand and applied in such a manner that the center point of the circumferential circle of the cylindrical opening of the guide element coincides exactly with the center point of the desired bore. Considering that the spacing between the outer edge of the rod-shaped part, which is in contact with the inner wall of the faulty bore, and the center point of the circumferential circle of the cylindrical wall corresponds exactly to the sum of the eccentricity amount and the radius of the faulty bore, the drilling aid is invariably fixed in position in or in contact with the faulty bore, viewed in the direction from the center point of the opening in the guide element towards the adjacent outer edge, so that the new bore can now be applied exactly. A particularly rigid arrangement is achieved, for example, when a manually held drilling aid is additionally pushed in the described direction. During drilling of the bore, the drilling tool is exactly guided by the cylindrical opening and cannot run off center, not even when entering the material. The resulting hole which, depending on the eccentricity between the bore and the faulty bore, exhibits an outer contour equalling the figure eight, with the two circles intersecting each other to a lesser or greater degree, has very sharp contours. The amount of material removed for the resulting bore is considerably smaller than for the bore obtained by the method described at the outset, and in addition the drilling process is considerably facilitated by the fact that only one tool is required. Depending on the size of the bore and/or of the amount of eccentricity and the loading on the object to be accommodated in the bore it may, moreover, be sufficient to fill the correct bore with a matching normal anchor as it will be enclosed and retained therein over a big portion of its periphery due to the fact that the bore can be drilled with high precision. If the amount of eccentricity is relatively high, i.e. when an opening of eight-shaped contour is obtained whose circles intersect each other by small amounts only, and if, for example, the object to be accommodated in the bore will be loaded only in one direction, it may not be necessary, for stability reasons, to fill the faulty bore. For practical use, mechanical drilling aids may be provided as complete sets for different eccentricity amounts and different hole diameters. Such sets may be available, for example, for the most frequently used hole diameters, for example 4, 5, 6, 8 and 10 mm, etc., and for different eccentricity amounts for each bore diameter. For a 5 mm bore, for example, the set may include drilling aids for eccentricity amounts of 1, 2, 3, 4, 5, 6, 7 and 8 mm. It should be noted that up to an eccentricity amount of 5 mm, one obtains a bore with intersecting cross-sections of the faulty bore and the correct bore, while an eccentricity amount of, for example, 7 mm will result in two neighboring bores which are separated only by a material web of approx. 2 mm width.

Accordingly, the object underlying the invention is solved by this arrangement fully and completely.

According to a particularly preferred embodiment of the invention, the cross-section of the rod-shaped projecting part is such that the space between the second bore and the remaining faulty bore is completely filled by the part. In the case of intersecting cross-sectional areas of the faulty bore and the correct bore, the projecting part exhibits a sickle-shaped cross-section filling completely the space between the bore and the faulty bore. The projecting part then is in contact with the inner wall of the faulty bore not only along one outer edge, but over a circumferential area corresponding exactly to the circumferential area of the faulty bore remaining after the correct bore has been drilled. The other arc of the sickle-shaped cross-section corresponds to the circumferential portion of the correct bore which is free from material, i.e. which forms the transition to the faulty bore. This means that this inner sickle-shaped area of the rod-like part closes the open portion of the circumferential area of the correct bore, or serves as a lateral guide for the drilling tool during drilling of the bore. This embodiment of the invention provides particularly exact guiding of the drilling tool not only in the axial, but also in the transverse direction. If the amount of eccentricity between the faulty bore and the correct bore is so important that the two cross-sectional areas do not contact each other, then the projecting part has a circular cross-section which again fills the faulty bore completely. It is thereby ensured that the material web between the faulty bore and the correct bore will not break and cause the drilling tool to run off abruptly into the faulty bore.

According to another embodiment of the invention, the length of the projecting rod-shaped part corresponds approximately to the depth of the faulty bore.

This feature provides the advantage that the drilling tool is guided laterally by the rod-shaped part throughout the whole drilling process.

According to another preferred embodiment of the invention, the rod-shaped part can be detached from the guide element and can be left in the object to fill the space between the bore and the faulty bore.

This feature provides the advantage that once the correct bore has been drilled the projecting part which served as a guide element serves additionally as a filler for the free space between the bore and the remaining faulty bore.

According to another embodiment of the invention, the rod-shaped part is a plastic part which is attached to the guide element firmly, but detachably, via a predetermined breaking point.

This feature provides the advantage that while firm and exact guiding of the drilling tool is provided during drilling of the bore, the projecting part can be separated from the guide element after completion of the bore, for example by a simple tilting movement of the guide element, and may remain in the object.

According to another preferred embodiment of the invention, the guide element is retained in a holder firmly, but detachably.

This feature provides the advantage that guide elements provided for different hole sizes and/or different eccentricity amounts can be inserted into one and the same holder whereby the mechanical drilling aid according to the invention is given great versatility by simple constructional measures. The holder may be given a size suited for use as a handle, or may be designed for being mounted rigidly to the object, and adapted to receive a guide element suitable for the bore to be drilled. After completion of the bore, the guide element can then be removed from the holder, and another guide element can be inserted.

According to another embodiment of the invention, the guide element is designed as a cylindrical body whose cylinder axis extends in parallel to the axis of the opening, and the cylindrical body can be mounted snugly in a cylindrical recess in the holder.

This feature provides the advantage to provide a guide element which can be produced by simple processes, for example as a cheap molded plastic part. This embodiment is particular well suited for cases where the rod-shaped part is to be broken off the guide element in order to remain in the bore as a filler. The cylindrical body of the guide element is then discarded after each processing operation.

According to another preferred embodiment of the invention, the outside of the cylindrical body is provided with a longitudinal bead intended for being engaged, in form-locking relationship, by corresponding grooves arranged about the circumference of the cylindrical recess.

This feature provides the advantage that the guide element can be introduced into the cylindrical recess of the holder, and retained therein, in defined positions. This possibility to select the position of the guide element enables the arrangement to be adapted in a flexible manner to the local conditions of the object into which the bore is to be drilled. If, for example, the bore is located near a corner, the guide element can be introduced into the holder in a suitable manner to adapt itself to the respective direction of eccentricity, while ensuring at the same time that the drilling aid can be held comfortably. To say it in other words, regardless of the direction in which the bore has run off, the holder can always assume a position equally convenient for the user.

According to another embodiment of the invention, the upper end of the recess, opposite the side from which the guide element is introduced, is provided with an annular shoulder defining the depth of penetration of the guide element.

This feature provides the advantage that the guide element will always be correctly mounted and retained in the holder.

Another preferred embodiment of the invention provides that when the guide element is fitted in the recess it ends flush with the lower contact edge of the holder.

This feature provides the advantage that, for example when a bore is to be drilled into a wall, the holder can be applied to the bore in such a manner that its lower contact edge rests flush against the wall.

According to another embodiment of the invention, the holder is provided with a handle piece enabling the holder to be held by hand.

This feature provides the advantage that the whole mechanical drilling aid can be held in practical use by one hand, with the rod-like part inserted into the faulty bore, while the other hand can be used for positioning a drilling machine, with the drilling tool mounted therein, on the drilling aid by introducing the drilling tool into the opening in the guide element. This makes it possible to correct numerous faulty bores easily and rapidly, if this should become necessary.

According to another advantageous embodiment of the invention, the handle piece extends perpendicularly to the plane of the object and is provided at a certain distance from the area of the holder provided with the recess.

This feature provides the advantage that on the one hand the holder can be gripped easily and securely when it rests against a wall, while on the other hand the spacing between the handle piece and the area carrying the guide element ensures that a drilling machine, for example, can be approached close to the opening without getting into contact with the handle piece.

Another embodiment of the invention provides that the opening in the guide element exhibiting the cylindrical wall is designed as a cylindrical hole.

This feature provides the advantage that the drilling tool is guided in the guide element substantially in form-locking engagement about its full circumference, whereby it is safely prevented from tilting or migrating.

According to another embodiment of the invention, the opening with the cylindrical wall is designed as a groove-shaped recess of semicircular cross-section.

This feature provides the advantage that the guide element can be produced particularly easily, and accordingly at low cost, in particular when the guide element is designed as a plastic molding. The guide element or the body from which the projecting rod-shaped part extends, may then have the shape of a longitudinally split annular disk so that the drilling tool can be introduced laterally into the opening with the cylindrical wall, or into the groove-shaped recess. The groove, which exhibits an at least semicircular cross-section, ensures that the drilling tool is safely guided, with the rod-shaped projecting part being of course arranged in this case approximately at the vertex of the horseshoe-shaped guide element or the vertex of the semicircular groove.

According to another preferred embodiment of the invention the rod-shaped part projecting from the guide element is provided with recesses or openings on the side facing the drilling tool.

This feature provides the advantage that when an anchor provided on its outside with projecting parts has been introduced into the correct bore the outside of that anchor can enter into engagement with the recesses or grooves. This ensures a particularly intimate and efficient connection between the anchor and the part remaining in the faulty bore.

According to another embodiment of the invention, a barblike contour is provided on that side or outer edge of the rod-shaped part which is in contact with the inner wall of the faulty bore.

This feature provides the advantage that the rod-shaped part which is intended to remain in the faulty bore after detachment of the guide element, cannot be pulled out or will resist any pulling forces thanks to its barb-like contour.

This feature is of particular advantage when used in connection with recesses or openings provided on the side facing the drilling tool, because this arrangement ensures on the one hand firm connection with an anchor and on the other hand firm retention of the assembly consisting of anchor and rod-like part in the wall.

It goes without saying that the features that have been described above and will be explained below may be used not only in the described combinations, but also in any other combination or individually without leaving the scope and intent of the present invention.

The invention will now be described in more detail by way of certain selected embodiments and with reference to the attached drawings in which:

FIG. 1 shows an exploded side view of the mechanical drilling aid according to the invention;

FIG. 2 shows a front view of the mechanical drilling aid according to FIG. 1;

FIG. 3 shows a top view of a guide element of the mechanical drilling aid according to the invention as illustrated in FIGS. 1 and 2;

FIG. 4 shows a bottom view of the guide element illustrated in FIG. 3;

FIG. 4a shows a bottom view, similar to that of FIG. 4, of another embodiment of a guide element;

FIG. 8 shows a longitudinal section through part of the arrangement shown in FIG. 7, but at a later point of the operating sequence;

FIG. 9 shows a section taken along line IX—IX in FIG. 8;

FIG. 10 shows a section taken along line X—X in FIG. 8;

Figure 6:
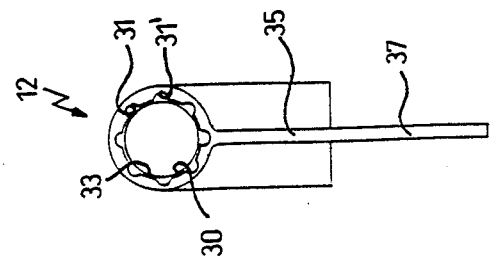
FIG. 6 shows a bottom view of the holder of the mechanical drilling aid illustrated in FIG. 1.

The mechanical drilling aid 10 illustrated in FIGS. 1 to 6 comprises a holder 12 and a guide element 14.

The guide element 14 comprises a cylindrical body 23 provided with a cylindrical opening 25. The cylinder axis of the cylindrical opening 25 and the cylinder axis of the cylindrical body 23 extend in parallel to each other.

The cylindrical body 23 is provided on its outside 24 with a bead 29 extending over its full height and exhibiting a substantially semicircular cross-section (see FIGS.

3 and 4). A rod-shaped part 16 projects from a lower circular surface of the cylindrical body 23.

The cross-section of the rod-shaped part 16 exhibits a sickle-shaped profile (see FIG. 4), with the curvatures of the sickle-shaped portion corresponding to the curvature of the cylindrical opening 25 in the guide element 14. The rod-shaped part 16 is arranged at the edge of the cylindrical opening 25 (see FIG. 4) in such a manner that the inner, shorter curved portion of the sickle-shaped cross-section coincides with a section of the circumferential line of the cylindrical opening 25. An outer longitudinal edge or outer edge 18 of the rod-shaped part is spaced a distance A from the center point $M_B$ of the cylindrical opening 25 or the cylinder axis extending therethrough.

The guide element 14 is designed as a molded plastic part.

The rod-shaped part 16 which extends perpendicularly from the lower cylinder surface of the guide element 14 is connected with the latter through a predetermined breaking point 27.

Accordingly, the rod-shaped part 16 may be separated from the cylindrical body 23 by a lateral tilting movement. The holder 12 is equipped with a plate-shaped handle piece 37 (see also FIGS. 5 and 6) ending forwardly in a lug portion provided with a cylindrical recess 30.

The design of the cylindrical recess is such that the guide element 14 can be introduced into the cylindrical recess 30 from below. The cylindrical recess 30 (see FIG. 6) is provided on its circumference with longitudinal grooves 31, 31'... viewed in the direction of introduction of the guide element 14, which correspond to the contour of the bead 29 provided on the cylindrical body 23 of the guide element 14. The depth of the recess 30 is selected in such a manner that the cylindrical body 23 of the guide element 14 can be introduced fully into the recess 30. The maximum insertion depth in the recess 30 is delimited by an upper, inner annular shoulder 33. In the fully inserted condition of the cylindrical body 23 of the guide element 14, its lower cylinder surface extends flush with a contact edge 35 of the holder 12. The fact that the bead 29 is retained in the groove 31 in form-locking engagement ensures that the guide element 14 is retained against rotation in the holder 12.

Figure 5:
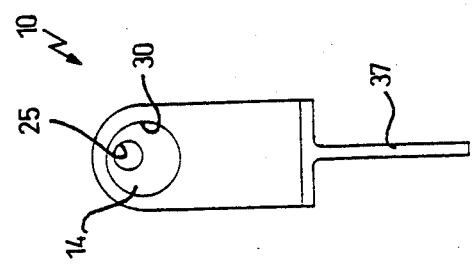
FIG. 5 shows a top view of the mechanical drilling aid according to FIG. 1, in the assembled condition.

The cylindrical opening 25 is accessible from above, viewed from above upon the mechanical drilling aid 10 composed of the holder 12 and the guide element 14 (FIG. 5).

Figure 7:
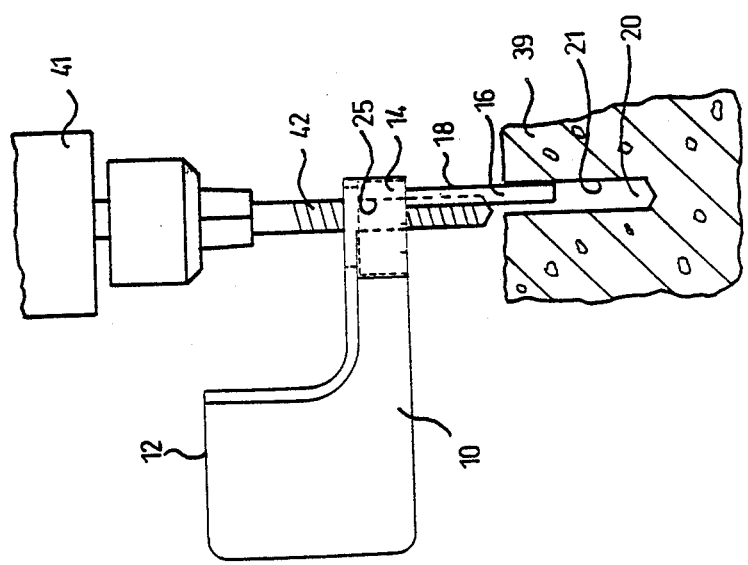
FIG. 7 illustrates diagrammatically the application of the mechanical drilling aid illustrated in FIG. 1.

The diameter of the cylindrical opening 25 corresponds to the diameter of a drilling tool or a drill 42 of a drilling machine 41 so that the drill 42 can be introduced from above through the mechanical drilling aid, as shown in FIG. 7.

Another embodiment of a guide element 14' shown in FIG. 4a exhibits substantially the same structure as that described with reference to FIG. 4, except that it is not designed as a cylindrical body with a bore, but rather—viewed from above—as a substantially horseshoe-shaped or U-shaped body with circular curvatures, as illustrated in FIG. 4a. The guide element 14' can be imagined to be the guide element 14 shown in FIG. 4, separated by a transverse cut extending through the center point $M_L$ of the opening 25. Consequently, the guide element 14' exhibits a groove-like recess 25' of semicircular cross-section. The rod-shaped part 16 is designed in such a manner that it applies itself about the zenith of the semicircular contour of the recess 25'. Regarded under the aspect of production technology, the guide element 14' is easier to produce as a molded plastic part than the guide element 14 as the production mold required for producing the guide element 14' only has to be provided with laterally projecting components to enable the contour of the guide element 14', as shown in FIG. 4a, to be produced by a continuous process. It goes without saying that the guide element 14' can be introduced also into the holder 12.

The mechanical drilling aid 10 according to the invention serves for drilling, with the aid of the drilling machine 41, a correctly positioned exact bore 22 into a wall 39, immediately adjacent a faulty bore 20 (see FIG. 8). The inner diameter of the faulty bore 20 corresponds to the outer diameter of the drill 42 which was used for producing the faulty bore.

The spacing between the longitudinal center axis $M_F$ of the faulty bore 20 (see FIG. 8) and the longitudinal center axis $M_B$ of the correct bore corresponds to the amount of eccentricity E between the bore 22 and the faulty bore 20. This means that the amount of eccentricity can be taken as a measure for the amount by which the faulty bore 22 is displaced from, or has run off the desired position of the bore 22.

Knowing this eccentricity amount E and the radius $r_F$ of the faulty bores 20 or the bores 22, one selects a guide element 14 where the distance A between the outer edge 18 of the rod-shaped parts 16, viewed across the center point or the longitudinal center axis $M_F$ of the faulty bore, and the longitudinal center axis $M_F$ of the cylindrical opening 25 in the cylindrical body 23 of the guide element 14 is equal to the sum of the eccentricity value E and the radius of the faulty bore 20 ($A = E + r_F$). For other eccentricity values and/or other dimensions of the faulty bores, correspondingly different guide elements 14 are used. However, all these guide elements comprise a cylindrical body 23 of the same diameter so that differently designed guide elements 14 can be introduced into one and the same holder 12.

As appears from FIG. 7, the mechanical drilling aid 10 according to the invention is introduced into the faulty bore 20 in such a manner that the outer edge 18 or the whole outer wall of the rod-shaped part 16 comes to rest against the inner wall 21 of the faulty bore 20. Thereafter, the drilling aid 10 is turned and, accordingly, aligned in such a manner that the center point $M_B$ of the cylindrical opening 25 in the cylindrical body 23 of the guide element 14 coincides exactly with the center point of the cross-section of the correct bore 22.

At the time of this operation, the drill 42 of the drilling machine 41 may already have been introduced through the cylindrical opening 25—as indicated in FIG. 7—so that the drill can be applied exactly upon the desired center point of the correct bore 22 by holding and turning the drilling machine 41 and the drilling aid jointly.

For the drilling operation proper, the drilling aid 10 is applied upon the walls 39 in such a manner that—as appears from FIG. 8—the contact edge 35 of the drilling aid 10 comes to rest against the outside of the wall. The rod-shaped part 16 projecting perpendicularly from the drilling aid, is thereby brought into intimate contact with the inner wall 21 of the faulty bore 20. The drill 42 of the drilling machine 41 is exactly positioned, both in the axial and in the transverse direction, by its form-locking engagement in the cylindrical opening 25 on the one hand and the contact between the rod-shaped part 16 and the wall of the faulty bore 20 on the other hand.

During penetration of the drill 42 into the wall 39, for the purpose of drilling the correct bore 22 (see FIGS. 8 and 10), the drill 42 is exactly guided laterally by the inner sickle-shaped portion of the rod-shaped part 16. If the holder 12 is gripped firmly by the handle piece 37, the drill is positively prevented from drifting away or running off center. The mechanical drilling aid according to the invention, therefore, makes it possible to apply the bore 22 exactly in the wall 39 without removing any material in the transition area between the correct bore and the faulty bore 20.

Once the correct bore 22 has been drilled, the drilling machine 41 and the mechanical drilling aid 10 can be lifted off the wall and an anchor or pin, for example, can be driven into the bore 22.

In cases where the pin is exposed to extreme upwardly or downwardly directed loads, there may be a risk of the pin or anchor tilting or evading into the free space of the faulty bore 20 remaining above the correct bore.

In such cases, the rod-shaped part 16 may be detached from the guide element 14 and pushed into this free space. This may be effected by providing a predetermined breaking point 27 exactly at the point of transition between the rod-shaped part 16 and the cylindrical body 23.

By proceeding in this manner, the wall 39 is filled completely, as shown in FIG. 10.

All parts of the mechanical drilling aid 10 illustrated in FIGS. 1 to 10 are made of a plastic material so that the whole arrangement can be produced from low cost plastic moldings.

In other embodiments of the invention, the holder 12 may consist of a metal. This solution may be selected, in particular, when a complete set of guide elements 14 is provided which latter may then, however, consist of disposable plastic parts or parts intended for a single use. Depending on the particular application, such a set may include one or more pieces of each guide element. If the method of breaking off the rod-shaped part 16 is chosen, then several identical guide elements 14 will be included in such a set.

It is of course also possible to make both the holder 12 and the set of guide elements 14 from metal in which case a particularly durable drilling aid suited for repeated use is obtained. Drilling aids of this type, which are designed for particular durability, are suited especially for professional operations.

Such a set then includes guide elements with cylindrical openings 25 adapted to the commonly used drill sizes.

In addition, a particular sub-set of guide elements 14 corresponding to the different eccentricity amounts E will then be provided for each drill size.

The eccentricity amount may in certain cases reach a value where the bore 22 and the faulty bore, or their cross-sections, do not come into contact with each other.

The rod-shaped part 16 then exhibits the shape of a cylindrical rod of a diameter equalling that of the faulty bore. It is then possible to drill another bore 22 immediately adjacent the faulty bore 22. The two bores will then be separated by a very thin material web only so that it may in some cases be desirable, for stability reasons, to leave the rod-shaped part 16 in the faulty bore 20 to fill the latter.

Figure 13:
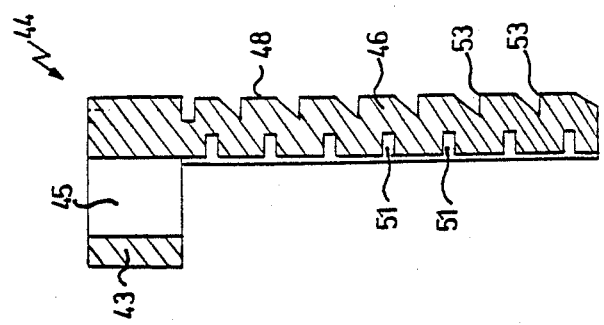
FIG. 13 shows a section taken along line XIII—XIII in FIG. 12.
Figure 12:
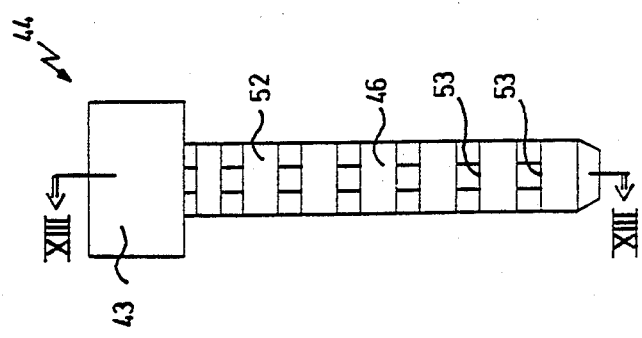
FIG. 12 shows another side view of the guide element of FIG. 11.
Figure 11:
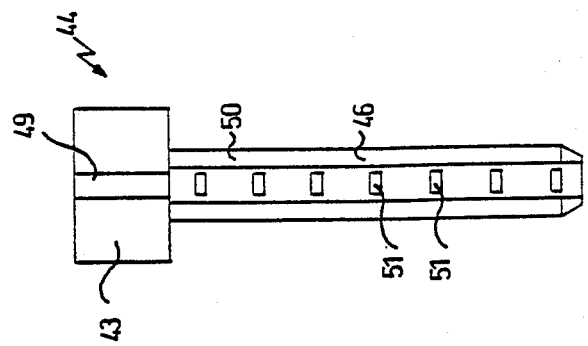
FIG. 11 shows a side view of another embodiment of a guide element.

Another embodiment of a guide element 44 illustrated in FIGS. 11 and 13 comprises again, as described before with reference to FIGS. 1 to 10, a cylindrical body 43 and a projecting rod-shaped part 46. A through-hole 45 arranged in the cylindrical body 43 serves for guiding a drilling tool, as described before.

The rod-shaped part 46 exhibits again a sickle-shaped cross-section and recesses or openings 51 provided on its side 50 facing the drilling tool. It is the function of the recesses/openings 51 that in cases where the rod-shaped part 46 is detached from the cylindrical body 43 and left in the space between the correct bore and the faulty bore, recesses or openings in the rod-shaped part 46 may be engaged by the parts projecting from the outside of an anchor introduced into the correct bore in order to ensure a firm connection between the anchor and the rod-shaped part 46 and to prevent these two parts from moving in the longitudinal direction relative to each other.

The side 52 of the rod-shaped part 46, opposite the side 50, is equipped with barbs 53. The barbs 53 on the side 52 of the rod-shaped part 46 may also be formed by recesses provided in the material. The rod-shaped part 46 rests against the inner wall of the faulty bore by its side 52 and/or along its outside 48. When the rod-shaped part 46 is to remain in the faulty bore after drilling of the correct bore, as described above, and when an anchor has been fitted in the correct bore and spread apart, for example by screwing in a screw, then the barbs 53 will be urged against the inner wall of the faulty bore in such a manner that the rod-shaped part 46 can no longer be withdrawn from the bore. This means that the barbs 53 take up practically the hooking effect of the fastener whereby the assembly comprising the fastener and the rod-shaped part 46 is fixed in the wall against any axial displacement.

I claim:

1. Mechanical drilling aid for guiding a drilling tool when drilling a correct bore into an object, in particular into a wall, said correct bore to be drilled being disposed eccentrically to an existing faulty bore, wherein the cross-sections of said faulty bore and said correct bore to be drilled intersect each other or extend immediately adjacent to each other, comprising:
   a guide element provided with an opening therein having a cylindrical wall serving for guiding said drilling tool, said cylindrical wall defining a circle at least as large as the circumferential circle of said drilling tool and having a longitudinal center axis coaxial with the axis of the drilling tool, and
   a rod-shaped part projecting from said guide element, said rod-shaped part being introducible into said faulty bore and abutting against an inner wall of said faulty bore, at least along an outer edge of said rod-shaped part, said rod-shaped part being detachable from said guide element so that it can be left in said object, thereby filling a space between said correct bore and said faulty bore,
wherein the distance between said outer edge of said rod-shaped part and said longitudinal center axis of said cylindrical wall in said guide element is equal to the sum of the amount of eccentricity between said faulty and said correct bore, and the radius of said faulty bore, wherein said distance is measured across a center point of said cross-section of said faulty bore.

2. Mechanical drilling aid according to claim 1, wherein a cross-section of said rod-shaped projecting part is such that said space between said correct bore and the faulty bore is completely filled by said part.

3. Mechanical drilling aid according to claim 2, wherein a length of said projecting rod-shaped part is substantially equal to a depth of said faulty bore.

4. Mechanical drilling aid according to claim 1, wherein said rod-shaped part is a plastic part which is attached to said guide element firmly, but can be broken off from said guide element via a predetermined breaking point.

5. Mechanical drilling aid according to claim 1, including a holder having means for detachably retaining said guide element firmly therein.

6. Mechanical drilling aid according to claim 5, wherein said guide element is designed as a substantially cylindrical body whose axis extends in parallel to the axis of said opening in said guide element, said cylindrical body being adapted for being mounted snugly in a cylindrical recess in said holder.

7. Mechanical drilling aid according to claim 6, wherein said cylindrical body has an outer circumference provided with at least one longitudinal bead intended for engaging, in a form-locking relationship, with corresponding grooves disposed circumferentially within said cylindrical recess.

8. Mechanical drilling aid according to claim 7, wherein an upper end of said recess, opposite to a side from which said guide element is inserted, is provided with an annular shoulder defining a maximum depth of penetration of said guide element into said recess.

9. Mechanical drilling aid according to claim 8, wherein said guide element, if inserted into said recess, ends flush with a lower contact edge of said holder.

10. Mechanical drilling aid according to claim 9, wherein said holder is provided with a handle piece enabling the holder to be held by hand.

11. Mechanical drilling aid according to claim 10, wherein said handle piece extends perpendicularly to a plane of said object and is arranged at a certain distance from an area of said holder provided with said recess.

12. Mechanical drilling aid according to claim 1, wherein said cylindrical shaped opening in said guide element is designed as a cylindrical hole.

13. Mechanical drilling aid according to claim 1, wherein said cylindrical shaped opening in said guide element is designed as a groove-shaped recess of semicircular cross-section provided in the guide element.

14. Mechanical drilling aid according to claim 1, wherein said rod-shaped part projecting from said guide element is provided with recesses or openings on a side facing said drilling tool.

15. Mechanical drilling aid according to claim 14, wherein said rod-shaped part is provided with a barb-like contour on that side or outer edge which is in contact with the inner wall of said faulty bore.

* * * * *